US012358402B2

(12) United States Patent
Zeng

(10) Patent No.: US 12,358,402 B2
(45) Date of Patent: Jul. 15, 2025

(54) TOP COVER AND BASE FOR CHILD SAFETY SEAT AND CHILD SAFETY SEAT

(71) Applicant: China Bambino Prezioso Co., Ltd., Guangdong (CN)

(72) Inventor: Xiangyong Zeng, Guangdong (CN)

(73) Assignee: China Bambino Prezioso Co., Ltd., Guangdong (CN)

(*) Notice: Subject to any disclaimer, the term of this patent is extended or adjusted under 35 U.S.C. 154(b) by 0 days.

(21) Appl. No.: 17/358,450

(22) Filed: Jun. 25, 2021

(65) Prior Publication Data
US 2021/0402894 A1 Dec. 30, 2021

(30) Foreign Application Priority Data
Jun. 29, 2020 (CN) .......................... 202021229657.2

(51) Int. Cl.
B60N 2/28 (2006.01)
(52) U.S. Cl.
CPC .................. B60N 2/2851 (2013.01)
(58) Field of Classification Search
CPC .................................................. B60N 2/2851
USPC ....................................................... 297/250.1
See application file for complete search history.

(56) References Cited

U.S. PATENT DOCUMENTS

| 6,543,844 | B1 | 4/2003 | Ryan et al. |
| 7,044,547 | B2 | 5/2006 | Sorrenti |
| 9,610,869 | B1* | 4/2017 | Holley, Jr. ........... B60N 2/2851 |
| 2003/0067198 | A1* | 4/2003 | Treen ..................... A47D 1/103 |
| | | | 297/250.1 X |
| 2005/0173956 | A1* | 8/2005 | Balensiefer .......... B60N 2/2851 |
| | | | 297/256.11 |
| 2007/0057547 | A1* | 3/2007 | Hartenstine .............. 297/256.13 |
| 2010/0084901 | A1* | 4/2010 | Flannery ................ A47D 1/103 |
| | | | 297/250.1 X |
| 2017/0282758 | A1* | 10/2017 | Mitchell ............. B60N 2/2851 |

FOREIGN PATENT DOCUMENTS

| AU | 1996075445 A | 6/1997 |
| CN | 204367924 U | 6/2015 |
| CN | 105015369 A | 11/2015 |

(Continued)

OTHER PUBLICATIONS

Australian Examination Report for Application No. 2021204285 dated Aug. 10, 2022.

(Continued)

Primary Examiner — Anthony D Barfield
(74) Attorney, Agent, or Firm — Volpe Koenig

(57) ABSTRACT

This disclosure provides a top cover for a base, a base for a child safety seat and a child safety seat, wherein the top cover comprises a top cover body, an upper surface of the top cover body is provided with a protrusion located at a front end of the top cover body, and the upper surface of the top cover body is further provided with a seat area located on a periphery of the protrusion for a child to sit. In the top cover this disclosure, a protrusion is provided on the upper surface of top cover body of the top cover, a protrusion can block a forward movement of a child sitting in the seat area when an accidental impact occurs, reducing a pressure on the child's abdomen due to the accidental impact, and making the child sitting on the top cover safer.

14 Claims, 2 Drawing Sheets

(56) References Cited

FOREIGN PATENT DOCUMENTS

| | | |
|---|---|---|
| CN | 110641328 A | 1/2020 |
| DE | 3536206 C2 | 2/1989 |
| FR | 2916391 A1 | 11/2008 |
| GB | 2076648 A | 12/1981 |
| JP | 2004268893 A | 9/2004 |
| KR | 20130026267 A | 3/2013 |
| WO | 2010039747 A2 | 4/2010 |

OTHER PUBLICATIONS

Notice of Acceptance issued in corresponding Australian Application No. 2021204285 dated Jul. 10, 2023.
"First Office Action Issued in Corresponding Australian Patent Application No. 2023248163", Mailed Date: Sep. 18, 2024, 5 pages.

* cited by examiner

TOP COVER AND BASE FOR CHILD SAFETY SEAT AND CHILD SAFETY SEAT

CROSS REFERENCE TO RELATED APPLICATIONS

This application is based upon and claims priority to Chinese Patent Application No. 202021229657.2, filed on Jun. 29, 2020, the entire contents thereof are incorporated herein by reference.

TECHNICAL FIELD

The present utility model relates to products for children, and particularly, relates to a top cover and a base for a child safety seat and a child safety seat.

BACKGROUND

A child safety seat is a seat specifically designed for children. By installing the child safety seat in a car for a child to sit thereon, the child safety seat is used to restrain the child to ensure safety of the child during driving. A traditional child safety seat generally includes a base for the child to sit and a backrest for the child to lean against. After the child sits on the base, if an accidental impact occurs, the child can move forward for a little distance with respect to the seat even the child is bound by a safety buckle. At this time, the child's abdomen will be pressured, which will adversely influence safety of the child.

SUMMARY

A first purpose of the present disclosure is to provide a top cover for a base, which can reduce a pressure on the child's abdomen when an accidental impact occurs.

A second purpose of the present disclosure is to provide a base for a child safety seat. The base includes a top cover, and the top cover may reduce a pressure on the child's abdomen when an accidental impact occurs, so as to ensure the safety of the child.

A third purpose of the present disclosure is to provide a child safety seat. The child safety seat includes a top cover, and the top cover may reduce a pressure on the child's abdomen when an accidental impact occurs, so as to ensure the safety of the child.

In order to achieve the first purpose, the present disclosure provides a top cover including a top cover body, wherein an upper surface of the top cover body is provided with a protrusion located at a front end of the top cover body, and the upper surface of the top cover body is further provided with a seat area located on a periphery of the protrusion for a child to sit.

In comparison with the conventional arts, in the top cover for the base according to the present disclosure, a protrusion is provided on the upper surface of the top cover body of the top cover, and can block a forward movement of the child sitting in the seat area when an accidental impact occurs, thereby reducing a pressure on the child's abdomen in the event of the accidental impact, and making the child sitting on the top cover safer.

Preferably, armrests are provided on left and right sides of the top cover body, respectively.

Preferably, the armrests and the top cover body are integrally formed.

Preferably, the top cover body is provided with several through holes.

In order to achieve the second purpose, the present disclosure provides a base for a child safety seat. The base includes a bottom cover and the top cover mentioned above. The bottom cover is connected to the top cover body of the top cover, and is located under the top cover body.

In comparison with the conventional arts, according to the present disclosure, the base for a child safety seat includes a top cover, and a protrusion is provided on the upper surface of the top cover body of the top cover. The protrusion can block a forward movement of the child sitting in the seat area when an accidental impact, thereby reducing a pressure on the child's abdomen in the event of the accidental impact, and making the child sitting on the base safer.

In order to achieve the third purpose, the present disclosure provides a child safety seat including a backrest and the base mentioned above, and the backrest is connected to a rear end of the base.

In comparison with the conventional arts, according to the child safety seat of the present disclosure, the base for the child safety seat includes a top cover, and a protrusion is provided on the upper surface of the top cover body of the top cover. The protrusion can block a forward movement of the child sitting in the seat area when the accidental impact occurs, thereby reducing a pressure on the child's abdomen in the event of the accidental impact, and making the child sitting on the base safer.

Preferably, the backrest is connected to a rear end of the top cover body.

Preferably, a headrest is further included, and the headrest is connected to an upper part of the backrest.

DETAILED DESCRIPTION

In order to illustrate the technical contents and structural features of the present disclosure in detail, the following description is provided below in conjunction with embodiments and drawings.

Figure 1:
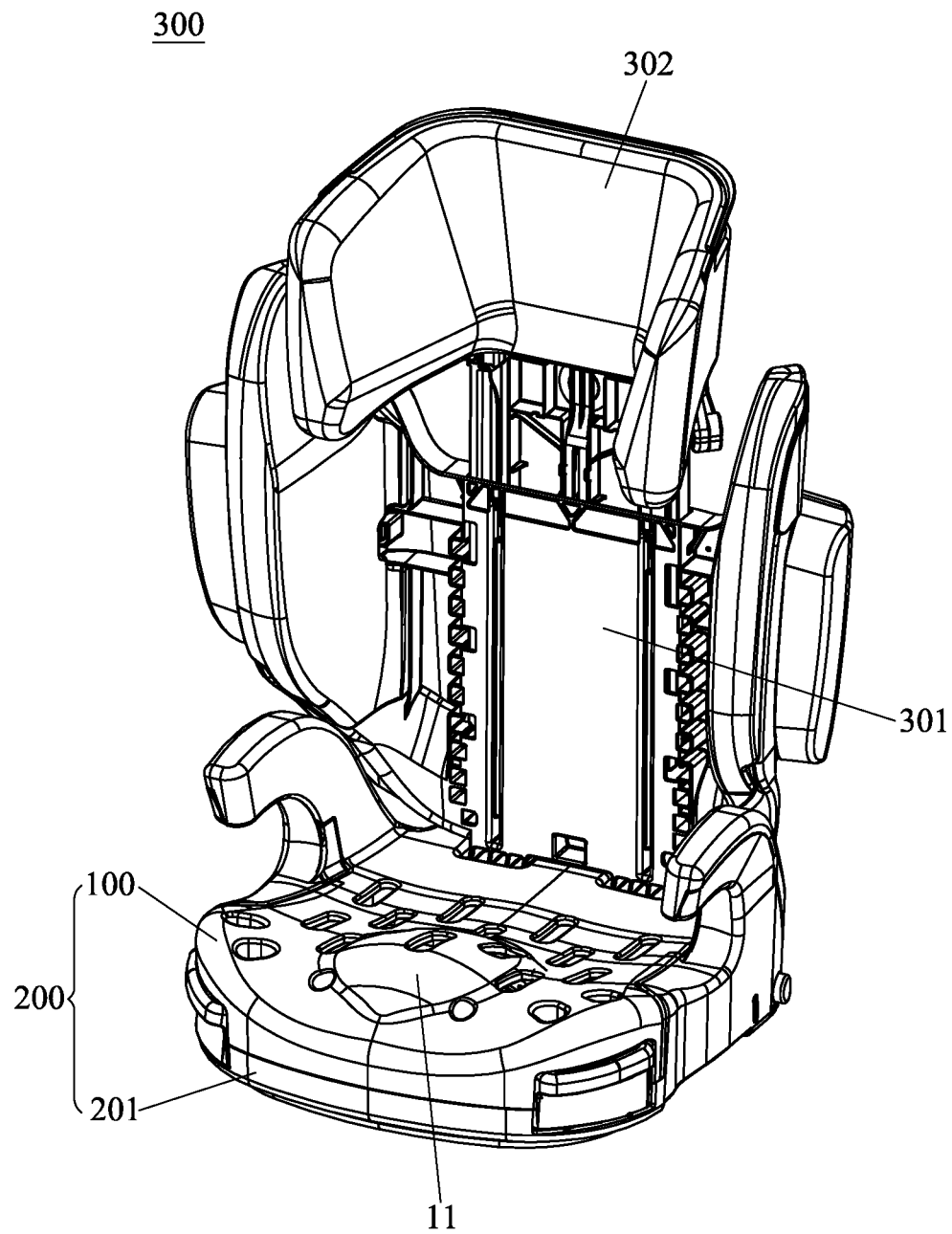
FIG. 1 is a perspective structural schematic diagram of a child safety seat of the present disclosure.
Figure 2:
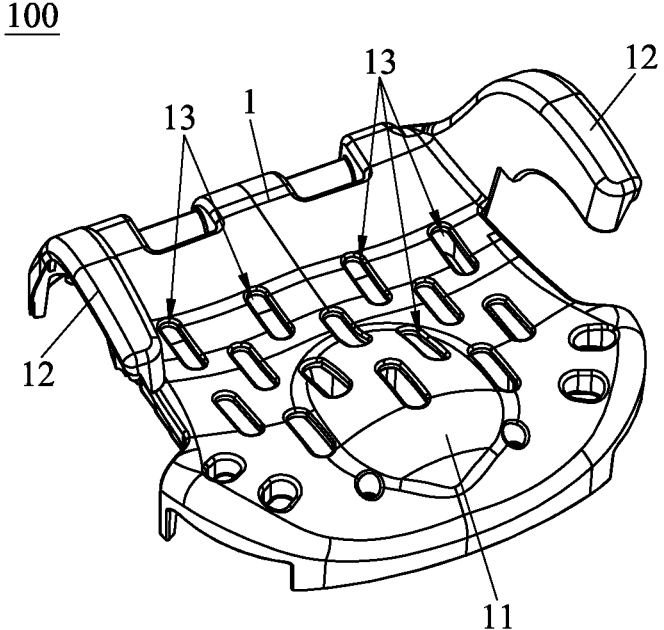
FIG. 2 is a structural schematic diagram of a top cover of the present disclosure.

Referring to FIGS. 1 and 2, a child safety seat 300 of the present disclosure includes a backrest 301, a headrest 302, and a base 200. The headrest 302 is connected to an upper part of the backrest 301, and the backrest 301 is connected to a rear end of the base 200. The headrest 302 is used for a child's head to lean against, and the backrest 301 is used for the child's back to lean against. Specifically, the base 200 includes a bottom cover 201 and a top cover 100. The top cover 100 includes a top cover body 1. A protrusion 11 is provided on an upper surface of the top cover body 1and is located at a front end of the top cover body 1. Specifically, the protrusion 11 is on a center of the front end of the top cover body. The upper surface of the top cover body 1 is further provided with a seat area on a periphery of the protrusion 11 for a child to sit thereon. The protrusion 11 is relatively higher than the seat area, and a height of the protrusion 11 declines from a center of the protrusion 11 to the periphery of the protrusion 11. When the child is seated in the seat area, a portion of the seat area neighboring a back side of the periphery of the protrusion 11 may accommodate a hip of the child, and a portion of the seat area neighboring a lateral side of the periphery of the protrusion 11 may accommodate a thigh of the child. Because the protrusion 11 is higher than the seat area, so when the accidental impact occurs, the protrusion 11 can block a forward movement of the child seated in the seat area, thereby reducing a pressure on the child's abdomen from the accidental impact. The bottom cover 201 is connected to the top cover body 1. The bottom cover 201 is located under the top cover body 1. The backrest 301 is connected to a rear end of the top cover body 1 of the top cover 100. Specifically, the bottom cover 201 is detachably attached to the top cover body 1, so as to facilitate more convenient manufacturing and installation.

Referring to FIG. 2, an armrest 12 is respectively provided on each of left and right sides of the top cover body 1. Further, the armrests 12 and the top cover body 1 are integrally formed, however, it is not limited thereto. For example, the armrests 12 may be fixed to the top cover body 1 by bolts.

Referring to FIGS. 1 and 2, the top cover body 1 is provided with several through holes 13, and the through holes 13 may be configured to connect with other parts such as a cushion.

In conclusion, the base 200 of the child safety seat 300 of the present disclosure is provided with the top cover 100, and the protrusion 11 is provided on the upper surface of the top cover body 1 of the top cover 100. If an accidental impact occurs, the protrusion 11 can block a forward movement of the child sitting in the seat area, thereby reducing a pressure on the child's abdomen, and making the child sitting in the base 200 safer.

The contents disclosed above are only preferred embodiments of the present disclosure, and cannot be used to limit the protection scope of the present disclosure. Accordingly, all the equivalent variations to the present disclosure still fall within the scope of the present disclosure.

What is claimed is:

1. A top cover for a base comprising:
  a top cover body including at least one backrest coupling disposed adjacent a rear end of the top cover body, the at least one backrest coupling being detachably connectable to a backrest,
  an upper surface of the top cover body is provided with a protrusion, and
  the upper surface of the top cover body is further provided with a seat area for a child to sit, the protrusion being positioned higher than a surrounding seat area, such that a height of the protrusion declines from a center of the protrusion to a periphery of the protrusion, and the seat area includes a hip portion and at least one thigh portion,
  wherein the hip portion is positioned adjacent a back side of the periphery of the protrusion, and the at least one thigh portion is positioned adjacent a lateral side of the periphery of the protrusion, and at least a portion of the at least one thigh portion is angled laterally downward toward the protrusion,
  wherein an end of the protrusion positioned closer to the rear end of the top cover body is rounded, and an end of the protrusion positioned further from the rear end of the top cover body is pointed, and
  wherein the top cover body is provided with several through holes extending through each of the protrusion, the hip portion, and the at least one thigh portion of the upper surface of the top cover body, and the several through holes are configured to connect to a cushion of the base.

2. The top cover according to claim 1, wherein an armrest is respectively provided on each of left and right sides of the top cover body.

3. The top cover according to claim 2, wherein the armrests and the top cover body are integrally formed.

4. The top cover according to claim 2, wherein the protrusion is laterally centered between the armrest respectively provided on each of the left and right sides of the top cover body.

5. The top cover according to claim 1, wherein the protrusion is offset from a front surface of the top cover body.

6. The top cover according to claim 5, wherein the protrusion is positioned closer to a front surface of the top cover body than a rear surface of the top cover body.

7. The top cover according to claim 1, wherein the protrusion is laterally centered about a width of the top cover body.

8. The top cover according to claim 1, wherein the protrusion is positioned higher than a radially surrounding seat area about an entire circumference of the protrusion.

9. The top cover according to claim 1, wherein the top cover body includes a wave-like shape extending laterally between lateral sides of the top cover body, with the protrusion being a central portion and highest point of the wave-like shape.

10. A base for a child safety seat comprising:
  a top cover comprising a top cover body, in which an upper surface of the top cover body is provided with a protrusion disposed laterally centered on the top cover body and closer to a front end than a rear end of the top cover body, and the upper surface of the top cover body is further provided with a seat area located on a periphery of the protrusion for a child to sit, wherein an end of the protrusion positioned closer to the rear end of the top cover body is rounded, and an end of the protrusion positioned further from the rear end of the top cover body is pointed; and
  a bottom cover detachably connected to the top cover body and located under the top cover body;
  wherein the top cover body is provided with several through holes extending through each of the protrusion, a hip portion, and at least one thigh portion of the upper surface of the top cover body, and the several through holes are configured to connect to a cushion of the base, and
  wherein the at least one thigh portion is positioned adjacent a lateral side of the periphery of the protrusion, and at least a portion of the at least one thigh portion is angled laterally downward toward the protrusion.

11. The base for a child safety seat according to claim 10, wherein an armrest is respectively provided on each of left and right sides of the top cover body.

12. The base for a child safety seat according to claim 11, wherein the armrests and the top cover body are integrally formed.

13. A child safety seat comprising:
  a backrest and a base, wherein the base comprises a bottom cover and a top cover,
  the top cover comprises a top cover body, in which an upper surface of the top cover body is provided with a protrusion located at a front end of the top cover body, and the upper surface of the top cover body is further provided with a seat area located on a periphery of the protrusion for a child to sit, wherein an end of the protrusion positioned closer to a rear end of the top cover body is rounded, and an end of the protrusion positioned further from the rear end of the top cover body is pointed;

the bottom cover is detachably connected to the top cover body, and the bottom cover is located under the top cover body, and the backrest is connected to a rear end of the base of the child safety seat, wherein the top cover body includes at least one backrest coupling disposed adjacent the rear end of the top cover body, and the backrest is detachably connected to the top cover body through the at least one backrest coupling;

wherein the top cover body is provided with several through holes extending through each of the protrusion, a hip portion, and at least one thigh portion of the upper surface of the top cover body, and the several through holes are configured to connect to a cushion of the base, wherein the at least one thigh portion is positioned adjacent a lateral side of the periphery of the protrusion, and at least a portion of the at least one thigh portion is angled laterally downward toward the protrusion.

14. The child safety seat according to claim 13, further comprising a headrest connected to an upper part of the backrest.

\* \* \* \* \*